UNITED STATES PATENT OFFICE.

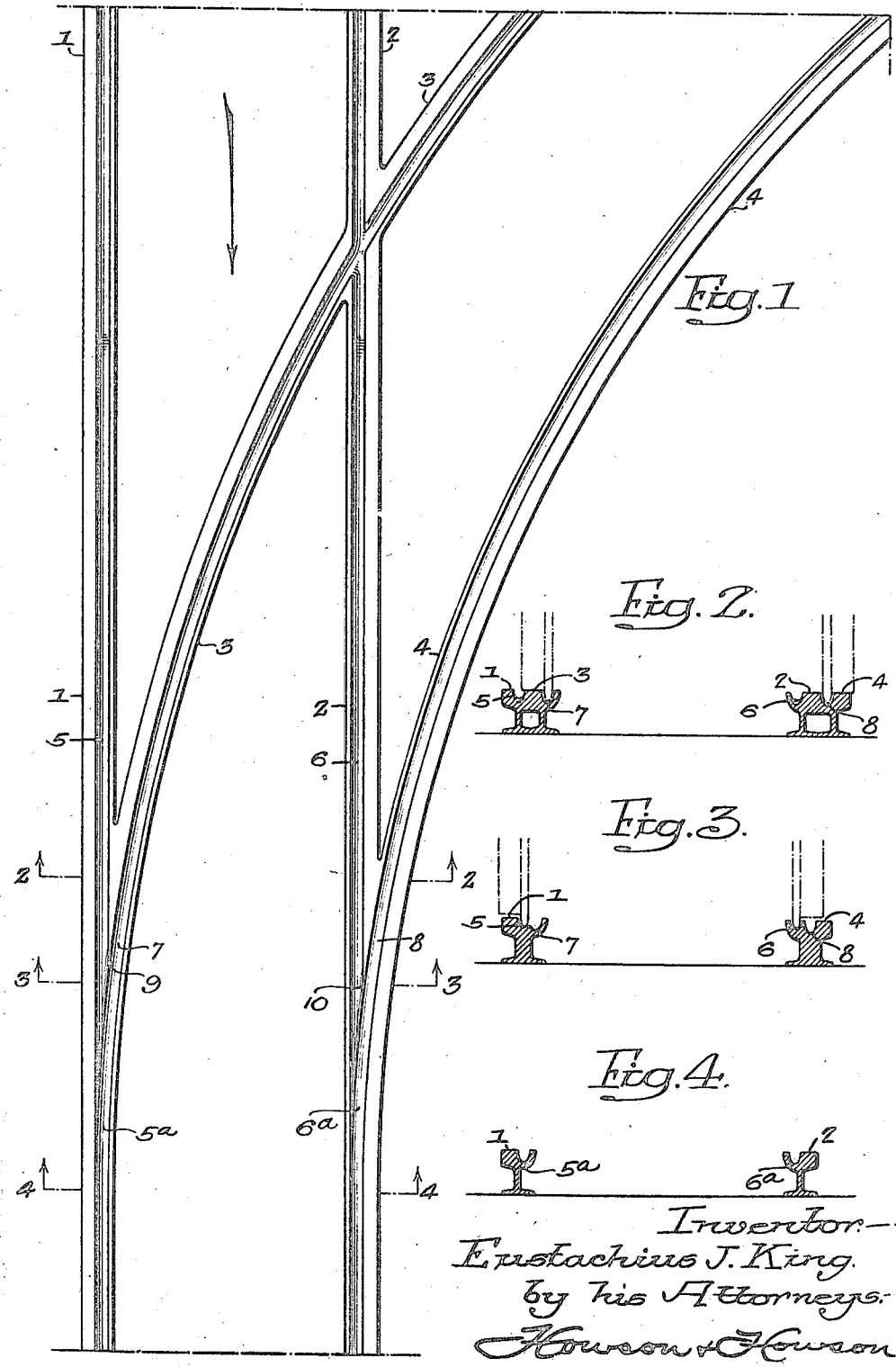

EUSTACHIUS J. KING, OF PHILADELPHIA, PENNSYLVANIA.

SWITCH CONSTRUCTION.

1,229,972.     Specification of Letters Patent.     Patented June 12, 1917.

Application filed November 3, 1916. Serial No. 129,371.

*To all whom it may concern:*

Be it known that I, EUSTACHIUS J. KING, a citizen of the United States, residing in Philadelphia, Pennsylvania, have invented a Switch Construction, of which the following is a specification.

One object of my invention is to provide a simple, substantial and relatively inexpensive form of switch in which all of the parts shall be permanently stationary, the construction being such that while a train or any portion thereof, when moving in one direction on a main track, may pass over said switch without being affected thereby, it will, when moving in the opposite direction, be deflected from the main track upon another track constituting a siding or branch.

These objects and other advantageous ends I secure as hereinafter set forth, reference being had to the accompanying drawings, in which, Figure 1 is a plan of a switch constructed according to my invention; and Figs. 2, 3 and 4 are vertical sections on the lines 2—2, 3—3 and 4—4, Fig. 1.

In the above drawings, 1 and 2 represent the rails of a straight or main line track and 3 and 4 the rails of a second track constituting a branch or siding which it is desired to connect with the main track. For this purpose the portions of the latter track adjacent its points of junction with the branch track 3 and 4, may be made in the form of comparatively heavy castings of which those for the rails 1 and 2 have straight grooves 5 and 6 for the reception of the wheel flanges. In said rail castings there are also formed curved grooves 7 and 8 for the reception of the flanges of wheels traveling on the curved track 3—4, and it is noted that while these latter grooves and also those portions $5^a$ and $6^a$ of the main track grooves immediately in front of the switch, are of such depth that the wheels are carried solely upon the heads of the rails, on the other hand, those portions of the grooves 5 and 6 of the main rails 1 and 2 beyond and up to the points of the switch are of a depth less than the height of the wheel flanges, so that wheels traveling on
this portion of the track move with their flanges in engagement with the bottom of said grooves.

The above described construction is particularly adapted for use on systems of track on which the usual traffic moves in the direction of the arrow, Fig. 1, so that the wheels of a train or car approaching the switch, move with their flanges in engagement with the bottoms of the grooves 5 and 6 until they pass over the points 9 and 10, where said grooves are gradually increased in depth to that of the grooves $5^a$ and $6^a$, and where the treads of the wheels travel upon the heads of the rails.

If, however, the car or train travels upon the main track in a direction opposite that indicated by the arrow, the flanges of the wheels are directed by the fixed switch points 9 and 10 into the grooves 7 and 8 of the branch track 3—4, this action being due to the engagement of said flanges with the side walls of the grooves $5^a$ and $6^a$ as the wheels approach said points.

I claim:—

1. A switch consisting of intersecting main and branch tracks having fixed points and formed with flange receiving grooves, of which those in front of the switch and in the branch track are deeper than those of the main track.

2. A switch consisting of intersecting main and branch tracks having fixed points and formed with flange receiving grooves, of which those of the main track in front of the switch and of the branch track are of a depth greater than the height of a wheel flange, while those beyond the switch are of a depth less than the height of such flange.

3. The combination in a switch of a main track and a branch track connected to said main track, said tracks being grooved; the grooves in each of the main tracks including a relatively deep portion and also a shallow portion gradually merging into said deep portion, and the grooves of the branch track forming a continuation of and being of substantially the same depth as the deep grooves of the main track.

EUSTACHIUS J. KING.

Copies of this patent may be obtained for five cents each, by addressing the "Commissioner of Patents, Washington, D. C."